July 28, 1959 H. A. SCHLATTER 2,897,339
RESISTANCE WELDING MACHINE
Filed Oct. 14, 1957
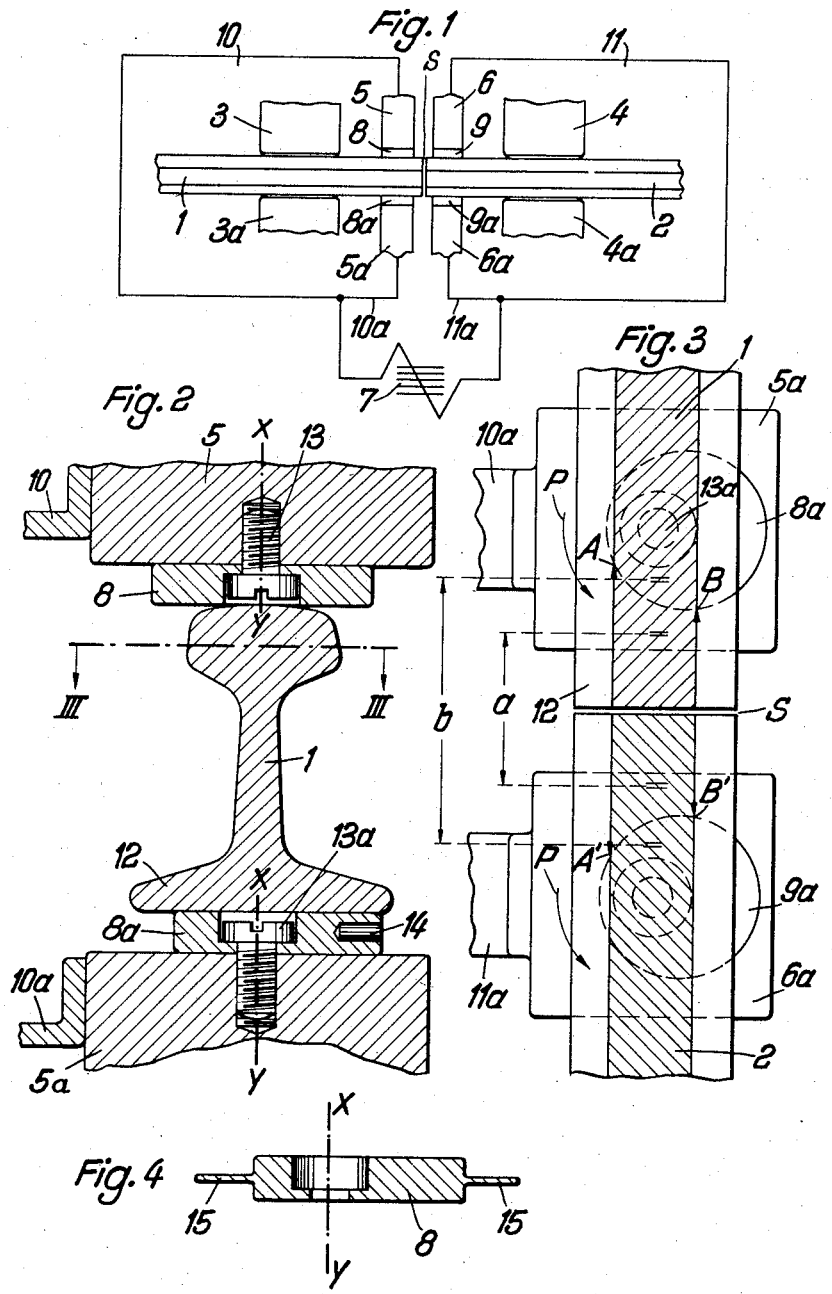
Inventor:
Hans A. Schlatter
by Michael S. Striker
Attorney United States Patent Office 2,897,339
Patented July 28, 1959

2,897,339

RESISTANCE WELDING MACHINE

Hans A. Schlatter, Zollikon (Zurich), Switzerland

Application October 14, 1957, Serial No. 690,019

Claims priority, application Switzerland October 15, 1956

7 Claims. (Cl. 219—101)

The present invention relates to resistance welding machines.

More particularly, the present invention relates to contact arrangements for resistance welding machines.

Resistance welding machines may be used for many purposes such as resistance welding a pair of rail portions of a railway track to each other. Resistance welding machines of the type used for this latter purpose consume a considerable amount of current on the order of 50,000–120,000 amperes, and as a result the inductance has a considerable influence.

In particular, the inductive effects result in non-uniform heating of the workpieces so that they are not uniformly welded together.

One of the subjects of the present invention is to provide a resistance welding machine with a structure which will enable adjustments to be made so as to provide uniform heating of the workpieces in spite of the inductive effects.

Another object of the present invention is to provide a structure of the above type with a means which will keep the structure relatively cool.

A further object of the present invention is to provide a structure of the above type which can be conveniently adjusted.

With the above objects in view the present invention includes in a resistance welding machine a pair of electrically conductive blocks which are adapted to be located in the electrical circuit of the machine respectively adjacent those portions of a pair of workpieces which are to be welded together at the latter portions. A pair of electrically conductive contact elements are respectively in engagement with these blocks and are adapted to engage the workpieces, respectively, adjacent the above portions thereof. A pivot means connects each of these contact elements to the block engaging the same for turning movement with respect to the latter block about an axis spaced from the center of the contact element so that the contact elements are eccentrically turnable with respect to the blocks, respectively, and in this way the positions of the contact elements with respect to each other may be regulated to promote uniform heating of the workpieces.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a fragmentary schematic side elevational view of a pair of workpieces and the welding machine structure engaging the same, Fig. 1 also showing the electrical circuit of the welding machine;

Fig. 2 is a transverse sectional elevational view through a workpiece and portions of the electrically conductive structure engaging the workpiece;

Fig. 3 is a fragmentary plan view taken along the line III—III of Fig. 2 in the direction of the arrows; and Fig. 4 is a transverse sectional view of a contact element according to the present invention.

As may be seen from Fig. 1 a pair of workpieces 1 and 2 in the form of rail lengths of a railway track are located adjacent to each other preparatory to being welded together at their adjacent ends, the welding region being indicated at S. The welding machine includes a pair of gripping elements 3 and 3a which grip the workpiece 1 and a pair of gripping elements 4 and 4a which grip the workpiece 2, the elements 3 and 3a being carried by a stationary part of the frame of the machine while the elements 4 and 4a are mounted on a carriage of the machine so that the workpiece 2 can be urged toward and into engagement with the workpiece 1 during welding of the workpieces together.

The electrical circuit of the welding machine includes a pair of contact blocks 5 and 5a located adjacent the rail 1 at positions close to the welding zone S, and a pair of similar blocks 6 and 6a cooperate in the same way with the rail 2, and all of these blocks are connected in circuit with the welding transformer 7 in the manner indicated in Fig. 1, Fig. 1 showing the leads 10 and 11 connected to the blocks 5 and 6, respectively, and the leads 10a and 11a connected electrically with the blocks 5a and 6a, respectively. The gripping blocks 3, 3a, 4, and 4a may be made of steel while the blocks 5, 5a, 6, and 6a may be made of copper or the like. By providing separate blocks for gripping the rails and separate blocks for passing the current through the rail end portions which are to be welded together, it is possible to keep the surface areas through which the electrical current passes relatively small and in the direct vicinity of the welding zone S, so that the surface areas through which the current passes can be very accurately defined and uniformly filled with lines of current. By locating the electrical connections very close to the welding zone S, the end portions of the workpieces through which the current passes are extremely short and in this way the ohmic and inductive resistance of the welding circuit is reduced. The advantages obtained by these expedients can only be fully utilized, however, when a uniform distribution of the current throughout the cross section of the end portions of the workpieces is provided in spite of the relatively small contact area provided by the electrodes.

It should be noted that the welding transformer 7 is actually located beneath the plane of the drawing of Fig. 1 directly behind the welding zone S so that the leads extending from the transformer to the pairs of electrodes 5, 5a and 6, 6a are extremely short.

In accordance with the present invention electrically conductive contact elements respectively engage the blocks 5, 5a, 6, 6a and are in direct engagement with the workpieces. Thus, electrically conductive contact discs 8 and 8a respectively engage the blocks 5 and 5a and are in direct engagement with the top and bottom faces of the rail 1, while the contact discs 9 and 9a are respectively in engagement with the blocks 6 and 6a and respectively engage the top and bottom faces of the rail 2. In accordance with the present invention a suitable means is provided for connecting these contact elements to the blocks which carry the same for adjustable movement with respect thereto in a manner promoting the uniform heating of the workpieces.

As may be seen from Fig. 2, the copper leads 10 and 10a are connected with the electrodes 5 and 5a, respectively, and these leads 10 and 10a are connected electrically with a common secondary pole of the transformer 7. The contact discs 8 and 8a are respectively located between the electrodes 5 and 5a and the rail 1 and directly engage the latter. The means which connects the contact elements to the electrodes takes the form of a pivot means which includes the bolts 13 and 13a respectively threaded into the electrodes 5 and 5a while passing through bores of the contact elements 8 and 8a so as to pivotally connect the latter to the blocks 5 and 5a, respectively. The bores of the contact elements are suitably countersunk so as to receive the heads of the bolts, and furthermore, the bore of each contact element is spaced from the center thereof so that the contact elements are mounted for eccentric turning movement on the electrodes, respectively. Although only electrodes 5 and 5a and contact elements 8 and 8a are shown in Fig. 2, it is to be understood that electrodes 6 and 6a with the contact elements 9 and 9a are of an identical construction. Thus, the bolts provide the turning axes x—y for the several contact elements, as indicated in the drawings.

Fig. 3 illustrates how the contact elements 8a and 9a which engage the base portions 12 of the rails 1 and 2, respectively, are adjustable with respect to each other. When these contact elements 8a and 9a are turned about their respective turning axes, they may be positioned between two extreme positions. Thus, the smallest distance between the pair of contact elements 8a and 9a is the distance a indicated in Fig. 3, while the largest distance is the distance b also indicated in Fig. 3. The contact elements 8a and 9a are shown in Fig. 3 at a position intermediate these extreme end positions. By locating the contact elements 8a and 9a between these extreme end positions thereof, the current distribution in the base portion 12 of the rails 1 and 2 is asymmetrical, and as a result it is possible to compensate for the inductive asymmetry.

In the position of the parts indicated in Fig. 3, the current flows to the rails through the cables 10a, 11a, the electrodes 5a, and 6a and the contact elements 8a, 9a. As may be seen from Fig. 3 there is provided as a result of the adjusted positions of the contact elements 8a and 9a a relatively long current path A—A' having a relatively low inductive load and a relatively short current path B—B' having a relatively high inductive load. Inasmuch as the specific resistance of the steel workpieces is several times greater than the specific resistance of the copper contact elements 8a and 9a, the current paths A—A' and B—B' have substantially different ohmic loads. By adjusting the positions of the contact elements with respect to each other the inductive loading can be compensated to such an extent that the rail bases 12 are heated at their portions most distant from the cables 10a and 11a to the same extent as the remainder of the portions of the rail bases, and as a result it is possible to provide perfect welding while using a very short preheating period and welding time.

The ratio between the current paths A—A' and B—B' can be adjusted within predetermined limits determined by the eccentricity of the pivotal mountings provided by the bolts 13 and 13a, and in order to adjust the ratio the discs may be turned in the direction of the arrows P of Fig. 3. It should be noted that the flat discs 8, 8a and 9, 9a need not be circular, although this latter configuration is preferred. They can be oval or polygonal. In order to easily carry out the adjustment by hand the discs are each provided at their outer periphery with a plurality of radial bores 14 (Fig. 2) adapted to receive a portion of a suitable instrument such as a spanner wrench or the like to enable the positions of the discs to be manually adjusted.

In order to promote cooling of the contact elements 8, 8a and 9, 9a each of these elements may be provided, as is indicated with the element 8a of Fig. 4, with cooling fins or ribs 15 which are welded or soldered onto the contact discs.

It will be understood that each of the elements described above, or two or more together, may also find a useful application in other types of welding machines differing from the types described above.

While the invention has been illustrated and described as embodied in a resistance welding machine, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a resistance welding machine, in combination, a pair of electrically conductive blocks adapted to be located in the electrical circuit of the machine respectively adjacent portions of a pair of workpieces which are to be welded together at said portions thereof; a pair of electrically conductive contact elements respectively engaging said blocks and being adapted to engage said workpieces, respectively, adjacent said portions thereof; and means adjustedly connecting each contact element to the block engaging the same for adjusting the position of each contact element on the block engaging the same, whereby the positions of said contact elements with respect to each other may be regulated to promote uniform heating of the workpieces.

2. In a resistance welding machine, in combination, a pair of electrically conductive blocks adapted to be located in the electrical circuit of the machine respectively adjacent portions of a pair of workpieces which are to be welded together at said portions thereof; a pair of electrically conductive contact elements respectively engaging said blocks and being adapted to engage said workpieces, respectively, adjacent said portions thereof; and pivot means connecting each contact element to the block engaging the same for turning movement with respect to the latter block about an axis spaced from the center of the contact element so that said contact elements are eccentrically turnable with respect to said blocks, respectively, whereby the positions of said contact elements with respect to each other may be regulated to promote uniform heating of the workpieces.

3. In a resistance welding machine, in combination, a pair of electrically conductive blocks adapted to be located in the electrical circuit of the machine respectively adjacent portions of a pair of workpieces which are to be welded together at said portions thereof; a pair of electrically conductive contact elements respectively engaging said blocks and being adapted to engage said workpieces, respectively, adjacent said portions thereof; pivot means connecting each contact element to the block engaging the same for turning movement with respect to the latter block about an axis spaced from the center of the contact element so that said contact elements are eccentrically turnable with respect to said blocks, respectively, whereby positions of said contact elements with respect to each other may be regulated to promote uniform heating of the workpieces; an additional pair of blocks respectively located opposite said first-mentioned pair of blocks and adapted to be located in said circuit adjacent parts of the workpieces opposite from those parts of the workpieces adjacent said first-mentioned pair of blocks, respectively; and a second pair of contact elements respectively engaging said additional blocks and adapted to directly contact the workpieces at parts thereof respectively opposite the parts of said workpieces adapted to be respectively engaged by said first-mentioned pair of contact elements.

4. In a resistance welding machine, in combination, a pair of electrically conductive blocks adapted to be located in the electrical circuit of the machine respectively adjacent portions of a pair of workpieces which are to be welded together at said portions thereof; a pair of electrically conductive contact elements respectively engaging said blocks and being adapted to engage said workpieces, respectively, adjacent said portions thereof; and means adjustedly connecting each contact element to the block engaging the same for adjusting the position of each contact element on the block engaging the same, whereby the positions of said contact elements with respect to each other may be regulated to promote uniform heating of the workpieces, each of said contact elements having cooling fins.

5. In a resistance welding machine, in combination, a pair of electrically conductive blocks adapted to be located in the electrical circuit of the machine respectively adjacent portions of a pair of workpieces which are to be welded together at said portions thereof; a pair of electrically conductive contact elements respectively engaging said blocks and being adapted to engage said workpieces, respectively, adjacent said portions thereof; and pivot means connecting each contact element to the block engaging the same for turning movement with respect to the latter block about an axis spaced from the center of the contact element so that said contact elements are eccentrically turnable with respect to said blocks, respectively, whereby the positions of said contact elements with respect to each other may be regulated to promote uniform heating of the workpieces, each of said contact elements having a circular configuration.

6. In a resistance welding machine, in combination, a pair of electrically conductive blocks adapted to be located in the electrical circuit of the machine respectively adjacent portions of a pair of workpieces which are to be welded together at said portions thereof; a pair of electrically conductive contact elements respectively engaging said blocks and being adapted to engage said workpieces, respectively, adjacent said portions thereof; and pivot means connecting each contact element to the block engaging the same for turning movement with respect to the latter block about an axis spaced from the center of the contact element so that said contact elements are eccentrically turnable with respect to said blocks, respectively, whereby the positions of said contact elements with respect to each other may be regulated to promote uniform heating of the workpieces, each of said contact elements having a circular configuration and being formed with a bore passing therethrough and spaced from the center thereof, said pivot means including a bolt passing through said bore of each contact element and threadedly connected with the block engaging the latter.

7. In a resistance welding machine, in combination, a pair of electrically conductive blocks adapted to be located in the electrical circuit of the machine respectively adjacent portions of a pair of workpieces which are to be welded together at said portions thereof; a pair of electrically conductive contact elements respectively engaging said blocks and being adapted to engage said workpieces, respectively, adjacent said portions thereof; and pivot means connecting each contact element to the block engaging the same for turning movement with respect to the latter block about an axis spaced from the center of the contact element so that said contact elements are eccentrically turnable with respect to said blocks, respectively, whereby the positions of said contact elements with respect to each other may be regulated to promote uniform heating of the workpieces, each of said contact elements being formed with openings adapted to receive a portion of an instrument for turning each contact element.

References Cited in the file of this patent
UNITED STATES PATENTS
2,250,870   Jones et al. _____ July 29, 1941